US008265979B2

(12) United States Patent
Golani et al.

(10) Patent No.: US 8,265,979 B2
(45) Date of Patent: Sep. 11, 2012

(54) AUTOMATIC GENERATION OF PROCESS MODELS

(75) Inventors: Mati Golani, Kiryat Motzkin (IL); Shlomit Pinter, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 3489 days.

(21) Appl. No.: 10/463,628

(22) Filed: Jun. 17, 2003

(65) Prior Publication Data

US 2004/0260590 A1    Dec. 23, 2004

(51) Int. Cl.
*G06Q 10/00* (2012.01)
(52) U.S. Cl. ...................................... 705/7.27
(58) Field of Classification Search ............... 705/8, 7.27
See application file for complete search history.

(56) References Cited

U.S. PATENT DOCUMENTS

| | | | | |
|---|---|---|---|---|
| 6,038,538 | A * | 3/2000 | Agrawal et al. | 705/7 |
| 6,279,009 | B1 * | 8/2001 | Smirnov et al. | 707/103 R |
| 7,069,179 | B2 * | 6/2006 | Kim et al. | 702/182 |

OTHER PUBLICATIONS

A.J.M.M. Weijters; W.M.P. van der Aalst; "Rediscovering Workflow Models from Event-Based Data using Little Thumb", (2001), Eindhoven University of Technology, pp. 1-8, retrieved from the web at http://citeseer.ist.psu.edu/582807.html.*
A.J.M.M. Weijters; W.M.P. van der Aalst; "Process Mining Discovering Workflow Models from Event-Based Data", (2001), Eindhoven University of Technology, pp. 1-8, retrieved from the web at http://citeseer.ist.psu.edu/weijters01process.html.*
Vassiliadis, et.al. "Data Warehouse Process Management", 2001, National Technical University of Athens, Department of Electrical and Computer Engineering, pp. 1-27, retrieved from the web at http://citeseer.ist.psu.edu/vassiliadis01data.html.*
Herbst, Joachim; "An Inductive Approach to the Acquisition and Adaptation of Workflow Models", 1999, DaimlerChrysler AG, pp. 1-6., retrieved from the web at http://citeseer.ist.psu.edu/251547.html.*
Agrawal, et al. "Mining Process Models from Workflow Logs", Lecture Notes in Computer Science, 1998, pp. 1-15.*
Van der Aalst, et al; "An Alternative Way to Analyze workflow Graphs",Lecture Notes in Computer Science, 2002, Springerlink, pp. 1-18.*
Van der Aalst, WMP; Von Dongen, BF; "Discovering Workflow Performance Models from Timed Logs", EDCIS 2002, LNCS 2480, pp. 45-63.*
Georgakopoulos, D., et al., "An Overview of Workflow Management: From Process Modeling to Workflow Automation Infrastructure," Distributed and Parallel Databases, 3, 119-153 (1995) © Kluwer Academic Publishers, Boston. Manufactured in the Netherlands; pp. 119-152.
Agrawal, R., et al., "Mining Process Models from Workflow Logs," Jan. 22, 1998, pp. 1-21.

* cited by examiner

*Primary Examiner* — Jonathan G Sterrett
(74) *Attorney, Agent, or Firm* — Daniel Kligler (57) ABSTRACT

A method for process modeling includes reading a record of executions of a process including at least first and second activities, and identifying in one of the executions in the record respective first and second lifespans of the first and second activities, defined by respective initiating and finish events, such that the initiating event of the second lifespan occurs during the first lifespan. A graphic model of the process is generated, so as to reflect a concurrency of the first and second activities, responsively to occurrence of the initiating event of the second lifespan during the first lifespan.

10 Claims, 5 Drawing Sheets

AUTOMATIC GENERATION OF PROCESS MODELS

FIELD OF THE INVENTION

The present invention relates generally to workflow management, and specifically to modeling of business processes.

BACKGROUND OF THE INVENTION

Businesses use workflow management to understand the processes carried out within their organizations, in order to improve efficiency and quality and to reduce costs. Georgakopoulos et al. have surveyed the main concepts and tools used in this field in an article entitled "An Overview of Workflow Management: From Process Modeling to Workflow Automation Infrastructure," *Distributed and Parallel Databases* 3 (Kluwer Academic Publishers, Boston, Mass., 1995), pages 119-153, which is incorporated herein by reference.

Workflow management systems typically use a visual model of information flow for purposes of monitoring and managing the business processes within an organization. In the context of the present patent application and in the claims, a "process" is defined as a set of activities, also known in the art as actions or tasks, together with constraints on execution order among these activities. The order of the activities may vary from one execution of the process to another, and not all the activities in a given process are necessarily included in every execution. Thus, a single business process model may permit one execution that includes a given activity and another execution that does not. (An "execution" is a single run through the process, or an instance of the process.) Typically, processes are modeled as directed graphs, having nodes representing individual activities and edges representing dependencies or constraints among the activities. In other words, if there is a process execution in which activity A has to be executed before activity B, then an edge appears in the process graph from A to B.

Many businesses do not have a full model of the complex processes that go on within their organizations. Building such a model manually is prone to error and requires large investments of time by members of the business organization and/or consultants. There is therefore a need for tools that can automatically build business process models based on information gathered by computer systems within the enterprise. Agrawal et al. describe such a tool, for example, in "Mining Process Models from Workflow Logs," in *Advances in Database Technology—EDBT'98, Proceedings of the Sixth International Conference on Extending Database Technology* (Springer Lecture Notes in Computer Science, 1998), pages 469-483, which is incorporated herein by reference. This tool analyzes a log of unstructured executions of a process in order to generate a graph that models the process.

SUMMARY OF THE INVENTION

Embodiments of the present invention provide improved methods and systems for automatic generation of process models based on workflow logs. Unlike workflow modeling tools known in the art, the methods of the present invention take into account that the execution of an activity in a business processes is not simply an atomic event, but rather has a certain lifespan, with a beginning and an end. The inventors have found that process models generated using this lifespan approach more faithfully represent the actual processes behind the logs, in terms of reducing the number of excess and missing edges in the process model graph.

In embodiments of the present invention, overlapping activity lifespans are taken into account in order to discover concurrent execution of certain activities in a process being modeled. Thus, for example, a log processor may, upon reading a process log, identify the lifespan of a first activity in an execution of the process, and may determine that the time of the initiating event of a second activity occurs during the first activity, indicating that the first and second activities overlap in time. This overlap is used by the processor in generating a graph representing the execution, taking the concurrency of the first and second activities into account. Typically, multiple execution graphs of this sort are merged in order to complete the process model graph.

A novel method is also provided for eliminating strongly-connected components from process models, which give rise to undesired cycles in process graphs.

There is therefore provided, in accordance with an embodiment of the present invention, a method for process modeling, including:

reading a record of executions of a process including at least first and second activities;

identifying in one of the executions in the record respective first and second lifespans of the first and second activities, defined by respective initiating and finish events, such that the initiating event of the second lifespan occurs during the first lifespan; and generating a graphic model of the process reflecting a concurrency of the first and second activities, responsively to occurrence of the initiating event of the second lifespan during the first lifespan.

In a disclosed embodiment, the process includes a business process, and wherein reading the record includes reading a workflow log of the business process, and generating the graphic model includes generating a workflow graph.

Typically, the initiating events of the first and second lifespans include respective first and second ready events, indicating that other activities precedent, respectively, to the first and second activities have been completed.

In an aspect of the invention, generating the graphic model includes generating a process model graph including a plurality of nodes corresponding to the activities in the process, wherein the nodes are connected by directed edges indicative of dependencies among the nodes, as determined by the lifespans of the activities in the record. In some embodiments, eliminating the directed edges between two or more of the nodes in response to the concurrency of the activities to which the two or more of the nodes correspond. Additionally or alternatively, generating the process model graph includes identifying a strongly-connected component including three or more of the nodes in the process graph, and removing at least one of the directed edges between the nodes in the strongly-connected component.

Further additionally or alternatively, generating the process model graph includes, given third and fourth activities among the activities in the process, identifying a dependence of the fourth activity upon the third activity if the fourth activity does not occur without the third activity in any of the executions, and both of the third and fourth activities occur together in at least a subset of the executions such that the finish event of the third activity precedes the initiating event of the fourth activity in all the executions in which both of the third and fourth activities occur, and responsively to the dependence, including a path in the graph from one of the nodes corresponding to the third activity to another of the nodes corresponding to the fourth activity.

In another aspect of the invention, generating the graphic model includes generating respective execution graphs for a plurality of the executions of the process, and merging the execution graphs to create a process model graph that models the process. In one embodiment, generating the respective execution graphs includes identifying forbidden edges due to the concurrency of the activities in the executions of the process, and merging the execution graphs includes eliminating the forbidden edges from the process model graph.

There is also provided, in accordance with an embodiment of the present invention, a method for process modeling, including:

reading respective records of a plurality of executions of a process;

generating a plurality of execution graphs corresponding respectively to the executions of the process; and merging the execution graphs to create a process model graph that models the process.

Typically, the process graph includes a plurality of nodes corresponding to the activities in the process, and each of the execution graphs includes a respective subset of the nodes, and merging the execution graphs includes creating flow graphs by combining the execution graphs that include the same respective subset of the nodes, and merging the flow graphs to generate the process model graph.

Additionally or alternatively, generating the plurality of the execution graphs includes, for each execution among the plurality of the executions adding nodes to a corresponding one of the execution graphs corresponding to the activities in the process occurring in the record of the execution, including, in at least one of the execution graphs, nodes corresponding to at least first and second activities among the activities in the process, and adding an edge from one of the nodes corresponding to the first activity to another of the nodes corresponding to the second activity only if the finish event of the first activity precedes the initiating event of the second activity. Typically, adding the edge includes adding the edge only if there is no third activity having a lifespan that starts and ends between the finish event of the first activity and the ready event of the second activity.

In a further aspect of the invention, the process model graph includes a plurality of nodes corresponding to the activities in the process, wherein the nodes are connected by directed edges, and wherein merging the execution graphs includes identifying a strongly-connected component including three or more of the nodes in the process model graph, and removing at least one of the directed edges between the nodes in the strongly-connected component. Typically, removing the at least one of the directed edges includes eliminating a cycle from the process model graph. In a disclosed embodiment, removing the at least one of the directed edges includes partitioning the nodes in the strongly-connected component into multiple sets, depending on the directed edges connecting the nodes in the strongly-connected component to the nodes outside the strongly-connected component, and choosing the at least one of the directed edges to remove based on the partitioning.

There is additionally provided, in accordance with an embodiment of the present invention, apparatus for process modeling, including:

a memory, which is coupled to receive and store a record of executions of a process including at least first and second activities; and a processor, which is coupled to access the record in the memory so as to identify in one of the executions in the record respective first and second lifespans of the first and second activities, defined by respective initiating and finish events, such that the initiating event of the second lifespan occurs during the first lifespan, and which is arranged to generate a graphic model of the process reflecting a concurrency of the first and second activities, responsively to occurrence of the initiating event of the second lifespan during the first lifespan.

There is further provided, in accordance with an embodiment of the present invention, apparatus for process modeling, including:

a memory, which is coupled to receive and store respective records of a plurality of executions of a process including at least first and second activities; and a processor, which is coupled to access the records in the memory so as to generate a plurality of execution graphs corresponding respectively to the executions of the process, and to merge the execution graphs to create a process model graph that models the process.

There is moreover provided, in accordance with an embodiment of the present invention, a computer software product for process modeling, the product including a computer-readable medium, in which program instructions are stored, which instructions, when read by a computer, cause the computer to read a record of executions of a process including at least first and second activities, to identify in one of the executions in the record respective first and second lifespans of the first and second activities, defined by respective initiating and finish events, such that the initiating event of the second lifespan occurs during the first lifespan, and to generate a graphic model of the process reflecting a concurrency of the first and second activities, responsively to occurrence of the initiating event of the second lifespan during the first lifespan.

There is furthermore provided, in accordance with an embodiment of the present invention, a computer software product for process modeling, the product including a computer-readable medium, in which program instructions are stored, which instructions, when read by a computer, cause the computer to read respective records of a plurality of executions of a process including at least first and second activities, to generate a plurality of execution graphs corresponding respectively to the executions of the process, and to merge the execution graphs to create a process model graph that models the process.

The present invention will be more fully understood from the following detailed description of the embodiments thereof, taken together with the drawings in which:

DETAILED DESCRIPTION OF EMBODIMENTS

Figure 1:
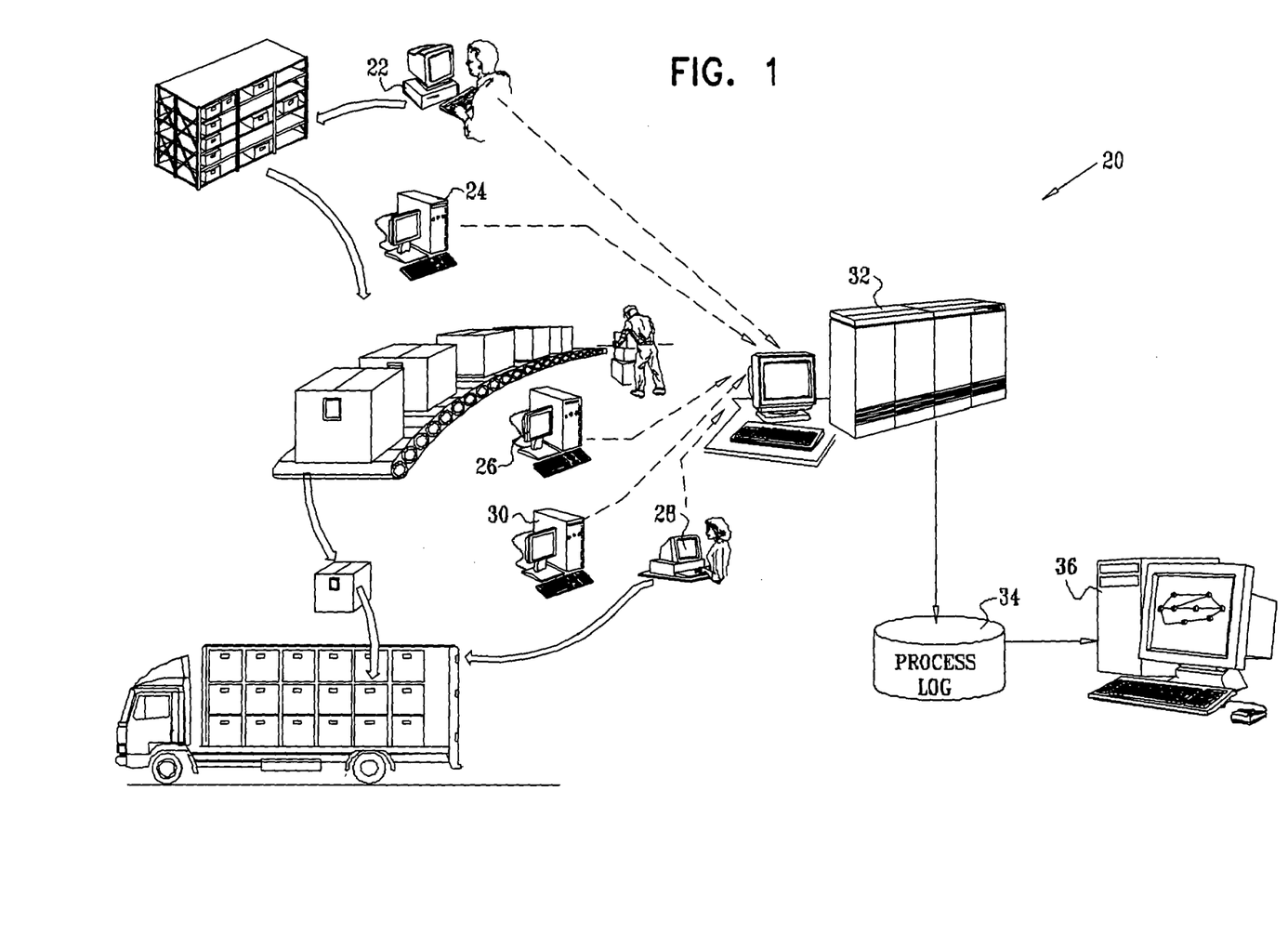
FIG. 1 is a schematic, pictorial illustration of a system for workflow modeling of a business process, in accordance with an embodiment of the present invention.

FIG. 1 is a schematic, pictorial illustration showing a system 20 for workflow modeling of a business process, in accordance with an embodiment of the present invention. By way of example, a typical production process is shown on the left side of the figure, using a network of computers to carry out and track the process within the enterprise. Inventory orders are placed through a purchasing workstation 22, following which inventory is tracked and moved into production using an inventory control workstation 24. A production control workstation 26 tracks the assembly of finished goods. A sales workstation 28 is used in receiving and fulfilling customer orders, while a shipping workstation 30 monitors transfer of the finished goods to a carrier for shipment.

Each of workstations 22, 24, ..., 30 reports each step or transaction it performs to a workflow server 32. For each execution of the process, server 32 records these events, along with their times of occurrence, in a process log (also known as a process audit log or a workflow log) in a memory 34. In fact, each of the functions of workstations 22, 24, ..., 30 may be viewed and recorded as a process in itself, with its own process log. For example, the process of receiving and servicing a customer order may be logged and modeled, as described below, independently of the other steps in the production process shown in FIG. 1. Larger business processes may be modeled as a hierarchy of smaller, component processes. These general aspects of workflow modeling and management are described further in the above-mentioned article by Georgakopoulos et al.

For each of the activities reported by workstations 22, 24, ..., 30, the process logs generated by server 32 contain records of key events associated with the activity, such as ready, started, restarted, ended normally, force finished and aborted (failed). Process logging of this sort is defined, for example, in the MQWorkflow Audit specified by the Workflow Management Coalition in "Interface 5—Audit Data Specification" (Technical Report WFMC-TC-1015, issue 1.1, Lighthouse Point, Fla., 2002), which is incorporated herein by reference. Each record in the log contains additional data, such as the time, process name, process ID (which includes an instance ID, identifying the execution), activity name, activity ID, and user ID.

A log processor 36 reads the process logs from memory 34 and uses these logs to build process model graphs, as described in detail hereinbelow. Typically, processor 36 comprises a general-purpose computer workstation, which is programmed in software to carry out these modeling functions. Alternatively, server 32 or substantially any other workstation in the enterprise may be programmed to serve as the log processor. The software for this purpose may be downloaded to the log processor in electronic form, over a network, for example, or it may alternatively be provided on tangible media, such as CD-ROM.

Figure 2:
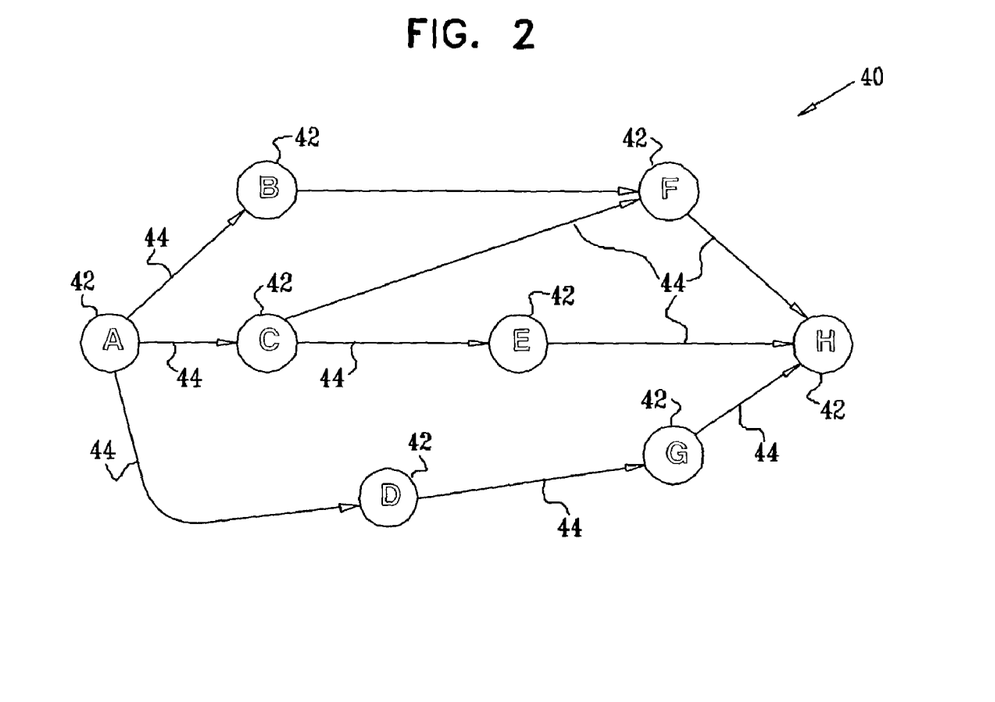
FIG. 2 is a graph representing a workflow process.

FIG. 2 shows a graph 40 that schematically illustrates an arbitrary business process, which is modeled by processor 36 in accordance with an embodiment of the present invention. Nodes 42 in graph 40 represent activities that may be carried out in the course of the process, beginning with a start activity A and finishing with an end activity H. Directed edges 44 represent the control flow of the process, indicating possible execution orders of the activities in the process.

By way of example, graph 40 could represent a process for making travel reservations. The process enables clients to make hotel, flight, and car reservations. The available options (possible scenarios) include (i) car reservation only, (ii) hotel and flight reservations, or (iii) both options. In addition, the client can indicate if he/she would like to join the customers' club; this option becomes effective only when a flight is reserved.

Activity A—the client enters the system, inserts his personal details and indicates the type of reservation needed. The choice or reservation type defines the scenario (i.e., the legal flow) that will follow.

Activity B—membership registration.

Activity C—the client inserts the required destination and dates.

Activity D—the client chooses the car type, pickup date and location.

Activity E—the system performs a query to locate appropriate hotels, and the client makes his/her choice.

Activity F—the system performs a query to locate suitable flights, and the client makes his/her choice.

Activity G—the client indicates return date and location. The system performs a query for available cars, and the client makes his/her choice.

Activity H—the client confirms the order, and reservation transactions are committed.

Thus, for example, edge 44 from node A to node B indicates that there is an execution of the process in which activity B can start executing immediately after the termination of activity A. A Boolean control function is associated with each edge in the graph. The decision as to whether B must execute following the execution of A depends on whether the associated control function evaluates to TRUE when applied to certain data available when execution of A is done (in this case, whether the customer chose to join the club after signing in at node A). It is assumed that there are no directed cycles (i.e., no closed loops) in graph 40. If a loop occurs in the actual process, it may be resolved in the graph by re-labeling activities and adding nodes to the graph accordingly. Workflow process graphs of the kind shown in FIG. 2 are described further in the above-mentioned article by Agrawal et al.

Typically, graph 40 is not known in advance, and must be approximately modeled by processor 36 based on information in the process logs in memory 34. The methods that the processor uses in modeling the process graph based on these logs are described in detail hereinbelow. The process model graphs generated by processor 36 seek to satisfy the following conditions:

Completeness: Every process execution in the log can be generated from the workflow graph.

Correctness: All the actual dependencies reflected by the log exist in the workflow graph.

Preserving parallelism: If the log shows that two activities, B and C, may occur concurrently, then there are two paths from the start to the end of the graph such that one includes B and does not include C and the other includes C and does not include B.

The object of processor 36 is to generate process model graphs that satisfy these conditions and which minimize the number of excess edges and missing edges, relative to the actual process itself.

For the purposes of the methods described below, we define a "legal flow" as a maximal connected subgraph of the workflow graph such that the control function evaluates to TRUE on each edge in the subgraph, both the start and end activities of the process are in the subgraph, and every activity (node) is on a directed path from start to end. A legal flow graph over a set of activities is a partial order representing all possible ways to schedule the selected activities, i.e., all possible executions. In such a legal flow graph, all nodes are assumed to be of the AND type, i.e., all the edges into and out of each of the nodes are traversed, so that an activity can be executed only if all its predecessor activities in the flow graph finished executing (AND join), and its successor activities can start executing only when its done (AND split). The union of all the legal flow graphs reconstructs the complete process graph.

A "legal execution" over a workflow graph, such as graph 40, is defined as a consistent linearization of a legal flow of the graph. Such an execution is represented by a list of activities, $A=a_1, a_2, \ldots, a_n$, starting with the start activity, $a_1$, and finishing with the end (target) activity, $a_n$. As noted above, no activity appears more than once in an execution list. A consistent linearization is a list that represents the flow graph and preserves edge ordering, so that if activity A is a predecessor of activity B in the legal flow, then whenever B appears in an execution, A appears before B in that execution.

Referring back to FIG. 2, by way of example, a first legal flow of graph 40 (hotel and flight reservation with membership registration) includes an edge from A to B, while a second legal flow (hotel and flight reservation without membership registration) does not include this edge (i.e., the control function on this edge evaluates to zero). Executions (A,A', B,B', C,C', F,E,E',F',H,H') and (A,A',C,C', B,B', F,E, E',F',H,H'), which include B, may thus result only from the first flow. Nodes B and C represent "concurrent" activities on the first flow, since in one of the executions of the flow B occurs before C, while in another execution, C occurs before B. B and C are both "immediate successors" of A; but E and F are not immediate successors of A, since there is no execution in which either E or F succeeds A without another activity intervening. Activity E "depends on" activities A and C, since whenever E appears in a legal execution, A and C must have appeared at some time earlier in the execution, i.e., activity E cannot run unless A and C were completed some time earlier. In graphic terms, if an activity $a_j$ depends on another activity $a_i$, then there must be a path from $a_i$ to $a_j$ in the workflow graph and in every legal flow derived from the graph. These conceptual definitions of concurrency, succession and dependence are expanded on below with respect to the "lifespans" of the activities, as reflected by the records in the process log.

Figure 3:
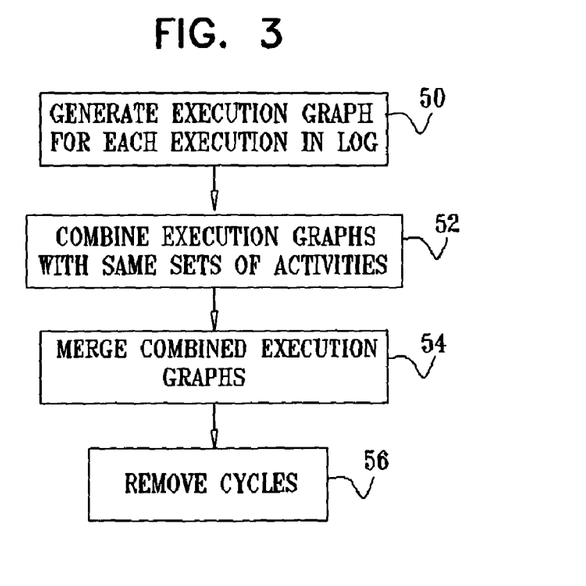
FIG. 3 is a flow chart that schematically illustrates a method for workflow modeling of a business process, in accordance with an embodiment of the present invention.

FIG. 3 is a flow chart that schematically illustrates a method for generating a process model graph based on the process logs in memory 34, in accordance with an embodiment of the present invention. Processor 36 begins the method by generating an execution graph for each logged execution of the process in question, at an execution graph generation step 50. For this purpose, processor 36 reads the log data from the memory in order to identify the activities occurring in each valid execution, based on the above-mentioned events recorded in the log for each activity (ready, started, restarted, ended normally, force finished and aborted). Events sharing the same process ID (including the instance ID, as noted above) are viewed as a single execution. Executions that contain noisy events, such as a forced finish of a certain activity, may be disregarded. Normally, the "start" of each activity in an execution is marked by its start or restart event, and the "finish" of the activity is marked by its end or termination event. An activity must be "ready" before it can start.

The "lifespan" of an executed activity is defined as the time interval from its initiating event to its finish event. Depending on the modeling approach that is taken, the "initiating event" may be either the ready event or the start event of the activity. For the sake of clarity in the description that follows, we refer to the "extended lifespan" as the time interval from the ready event to the finish event of an activity, and we use this extended lifespan for the purpose of detecting concurrent activities. Alternatively, other types of lifespans, with different initiating and/or terminating events, may be used for this purpose.

In a distributed business system, such as the production system shown in FIG. 1, the time stamps of events are given locally by each component, i.e., by each workstation 22, 24, . . . , 30. In practical terms, this distributed timing may cause the ordering of two events in the log, as indicated by their time stamps, to be incorrect. For the purposes of the present method, it is assumed that the clocks keep causality order, so that if activity B is a successor of activity A (there is an actual dependence of activity B on activity A), then the time stamp of the ready event of activity B is necessarily greater than the time stamp of the finish event of A. This assumption can be maintained in practice either by using a global clock or by adding the time of the end event of the preceding activity to the data used in the control functions that trigger the succeeding activities. The time of the end event can then be used to adjust the time of the ready event of the successor (at least in the log) so that it follows the termination of its predecessor.

The method used by processor 36 in building the execution graphs at step 50 and, subsequently, in combining the execution graphs to produce the full process model graph, is based on the relation between activity times and lifespans and on the notions of concurrency, dependence and succession of activities described above. Activities $a_i$ and $a_j$ are considered to be concurrent activities with respect to the log if one of the following conditions is satisfied:

There are two executions in the log over the same set of activities such that $a_i$ appears before $a_j$ in one execution, and $a_i$ appears after $a_j$ in the other execution; or There is an execution in the log such that the extended life spans of $a_i$ and $a_j$ overlap.

Activity $a_i$ depends on activity $a_j$ with respect to the process log iff whenever $a_i$ appears in some execution in the log, $a_j$ appears in that execution some time earlier, and the time of the termination event of $a_j$ is smaller than the time of the ready event of $a_i$. Since some legal executions may not be present in the log, and since parallel activities may appear sequentially in an execution, some activities that are not mutually dependent in the actual workflow process may be considered to be dependent with respect to the log. Activity $a_i$ is not a successor of $a_j$ with respect to the log if in every execution in the log, at most one of $a_i$ and $a_j$ is present.

After generating the individual execution graphs for each execution in the process log, processor 36 combines the execution graphs that include the same set of activities, at a graph combination step 52. These combined execution graphs, referred to herein as reconstructed flow graphs, are then merged to generate a complete process model graph of the entire process, at a full graph generation step 54. This two-step combination process is not essential, and the complete process model graph may be generated from the individual execution graphs in a single step, if desired. The inventors have found, however, that the two-step process tends to reproduce the graph of the actual process with fewer missing edges, possibly because the reconstructed flow graphs generated at step 52 correspond actually to different legal flows of the process. Processor 36 refines the full graph by removing any strongly-connected components (cycles) within the process graph, at a cycle removal step 56. All the steps of the method of FIG. 3 are described in greater detail hereinbelow.

Figure 4:
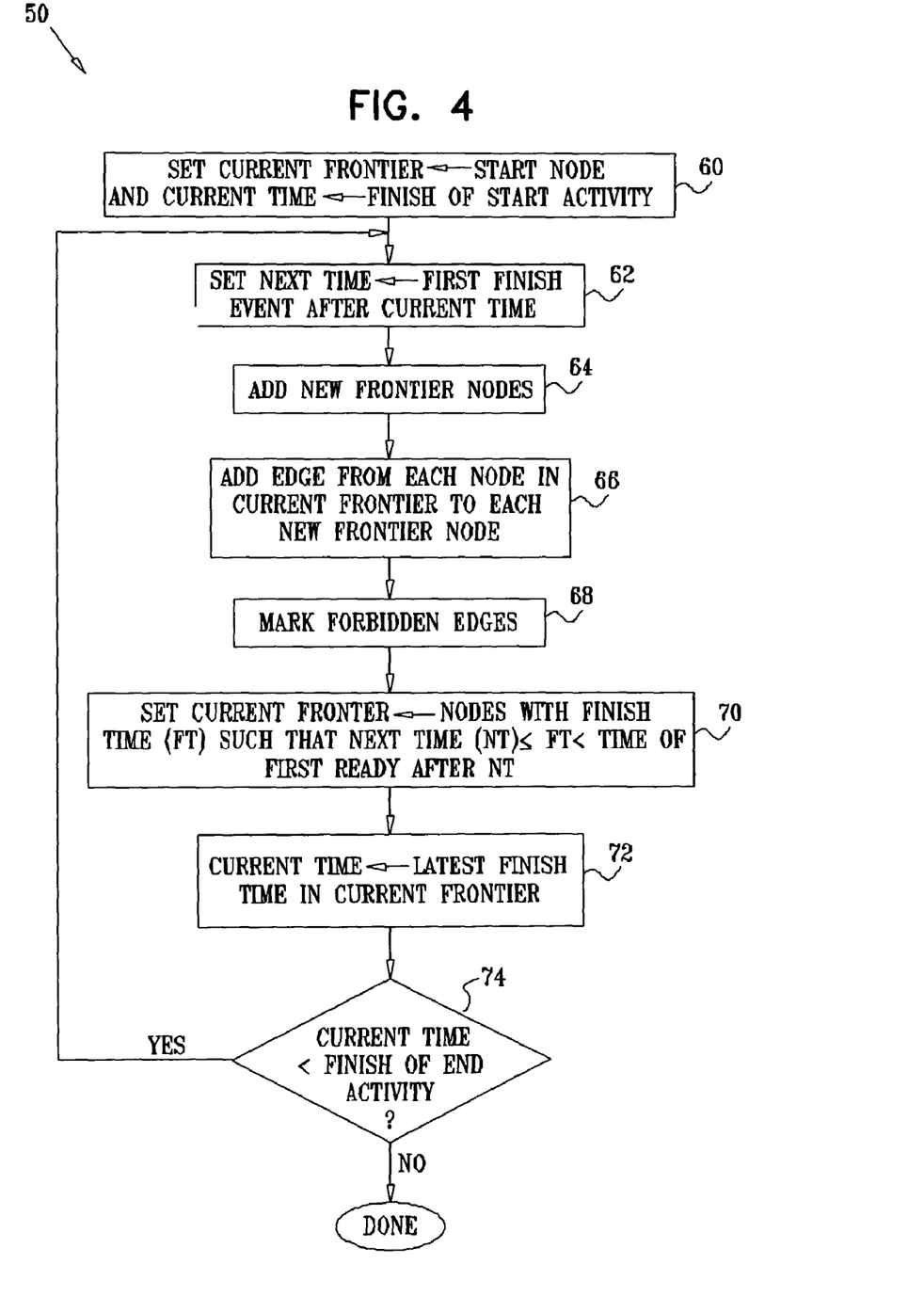
FIG. 4 is a flow chart that schematically illustrates a method for generating an execution graph, in accordance with an embodiment of the present invention.

FIG. 4 is a flow chart that schematically shows details of execution graph generation step 50, in accordance with an embodiment of the present invention. During the generation of the execution graph, processor 36 maintains two sets of nodes: the "current frontier" nodes and the "new frontier" nodes. The nodes in the current frontier are the latest nodes that were added to the graph. The processor also maintains two markers along the time axis: current time and next time. Initially, the start node is set to be the current frontier, and the time of its finish event is set to be the current time, at an initialization step 60. Next time is set to be the time of the first finish event following the current time, at a next time setting step 62. Then, a node is added to the execution graph for each activity in the current execution in the log whose ready event occurs between the current time and the next time, at a node addition step 64. These nodes constitute the new frontier.

Processor 36 adds an edge to the execution graph from each node in the current frontier to each node in the new frontier, at an edge addition step 66. These edges connect the nodes in the current frontier to their possible successors in the process graph. At the same time, the processor makes a record of forbidden edges, at an edge elimination step 68. These forbidden edges mark pairs of activities whose lifespans were found to overlap in the execution and therefore should not be connected by an edge in the complete process model graph. (For example, referring to the example shown in FIG. 2, if it were found that the ready or start event of activity B occurred between the ready and finish events of activity C, a pair of forbidden edges—BC and CB—would be added to the set.)

After adding the edges between the current and new frontiers, processor 36 advances the current frontier, at a current frontier incrementing step 70. For this purpose, the processor finds the first ready event following next time (as long as there is such a ready event). The current frontier is then set to include the nodes whose finish events occur at the next time, as well as the nodes whose finish events occur between the next time and the first ready event after next time. The current time is then advanced to be the latest finish time among the nodes in this new current frontier, at a current time setting step 72. Processor 36 iterates through steps 62 through 72 until the current time reaches the finish event of the end activity in the process, at a completion step 74. The execution graph is then complete.

The result of this iterative process is that an edge is added between nodes corresponding to two activities in the execution graph only if the finish event of the first activity occurs before the ready event of the second activity, and there is no other activity whose lifespan starts and ends between the finish event of the first activity and the ready event of the second activity.

FIGS. 5A-5D show exemplary execution graphs 80, 82, 84 and 86, respectively, generated using the method of FIG. 4. These execution graphs correspond to different executions of the process represented by graph 40, as shown in FIG. 2. The execution graphs are derived from the following log records:

Graph 80: A,A',B,C,D,C',E,B',F,D',F',G,G',E',H,H'
Graph 82: A,A',C,B,D,D',B',G,C',E,F,F',G',E',H,H'
Graph 84: A,A',C,C',F,E,E',F',H,H'
Graph 86: A,A',D,D',G,G',H,H'

In these records, X represents the ready event of activity X, while X' represents the finish event. All the events are listed in temporal order.

Figure 5A:
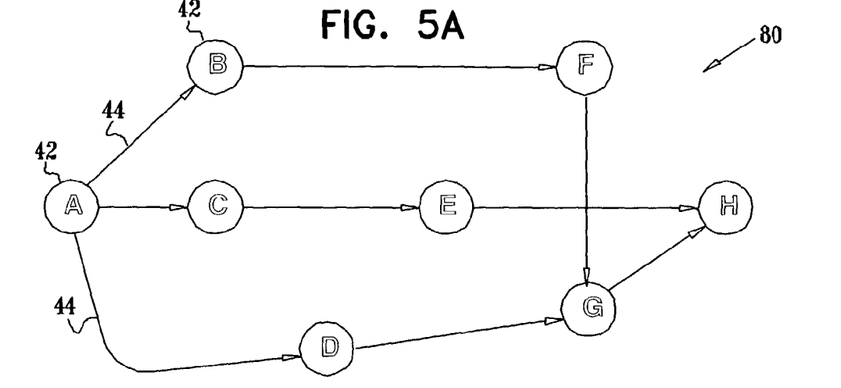
FIGS. 5A-5D are execution graphs generated using the method of FIG. 4.
Figure 5B:
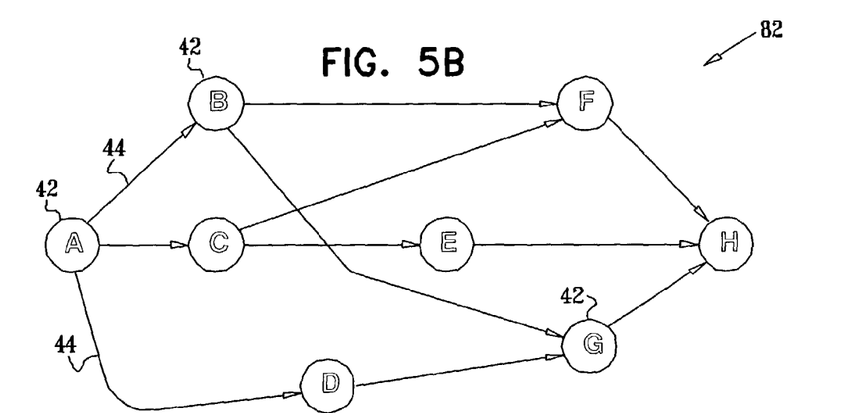
Figure 5C:
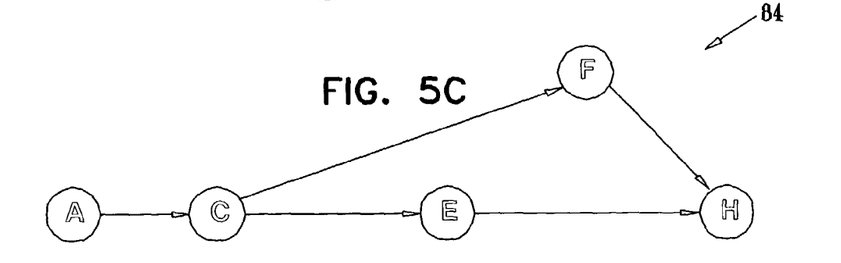
Figure 5D:
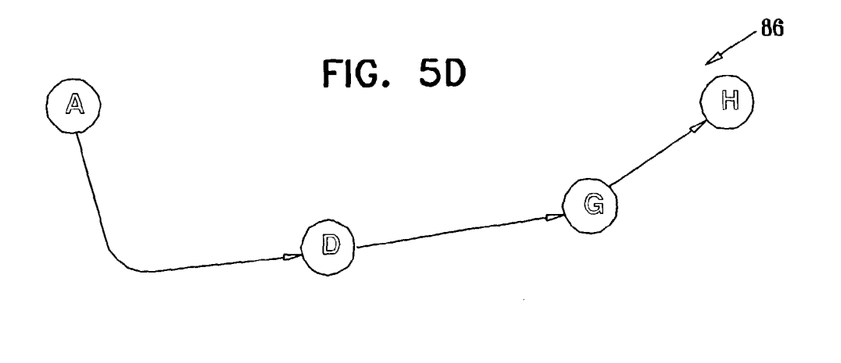

Each of the execution graphs represents the flow of the corresponding execution, but does not necessarily reflect all possible concurrencies in the lifespans of the different activities. Therefore, the execution graphs may contain redundant edges, such as the edges connecting F and G in graph 80 and connecting B and G in graph 82. When combining the execution graphs at step 52 (FIG. 3), most or all of these redundant edges are typically eliminated using the forbidden edges found at step 68. Thus, for example, in the execution of graph 80, activity B is seen to overlap activities C, D and E, so that forbidden edges will be marked (in both directions) between node B and each of nodes C, D and E. In addition, each edge that appears in one or more of the execution graphs may be assigned a weight, corresponding to the number of executions for which that edge actually appeared in the corresponding execution graph. Edges with low weight, such as edges appearing in less than 5% of the execution graphs, may be eliminated from the combined flow or process model graphs.

Figure 6:
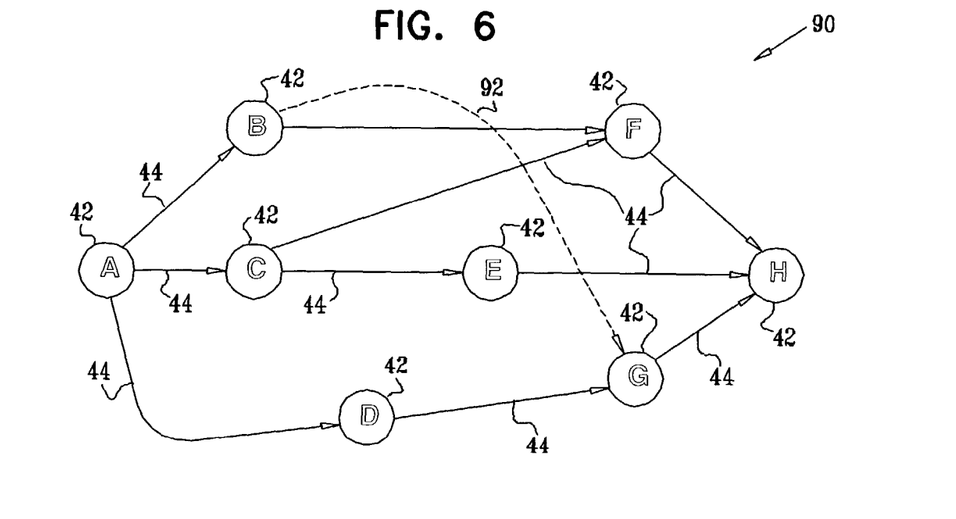
FIG. 6 is a process model graph of the process of FIG. 2, generated using the method of FIG. 3.

FIG. 6 is a reconstructed flow graph 90, which is created at step 52 by combining the execution graphs that include the same set of activities. In this example, graph 90 is generated by merging graphs 80 and 82, shown in FIGS. 5A and 5B, which share all of activities A, B, C, D, E, F, G and H. Graph 90 thus has the same nodes as the constituent execution graphs. The nodes in graph 90 are connected by edges corresponding to the union of all the edges in the execution graphs, less the forbidden edges. Thus, in combining graphs 80 and 82, the edge (F,G) in graph 80 is removed because it is forbidden by the log record of graph 82, as listed above. A spurious edge 92 remains in graph 90, however, because although activities B and G could legally execute concurrently, there is no execution in the log reflecting this concurrent execution. It will be observed that all the listed executions over the set of nodes in graphs 80 and 82 may be generated from both this reconstructed flow graph and from the actual process graph 40. All the nodes in the reconstructed flow graphs are AND-type nodes.

When the reconstructed flow graphs are merged at step 54, some of the nodes may be changed to OR-type nodes if the nodes are connected to different edges in different flows. The merge at this step is performed similarly to the merging of the execution graphs at step 52, taking the union of the edges over all the nodes. In the case of graphs 80, 82, 84 and 86 shown above, the final, combined graph will have the same form as graph 90, shown in FIG. 6, except that some of the nodes change to OR semantics.

Although graph 90 contains no strongly connected components (which would lead to cycles in the graph), the merged graph generated at step 54 may in general contain such cycles. The first concurrency condition listed above may be used to eliminate some spurious edges in the merged graph, i.e., if there is an edge from $a_i$ to $a_j$ in one reconstructed flow graph, and from $a_j$ to $a_i$ in another, both edges are removed. The above-mentioned condition regarding successor activities—that activity $a_i$ is not considered a successor of $a_j$ if $a_i$ and $a_j$ do not appear together in some execution in the log—is also observed by the merged graph. At this stage, however, there are no more forbidden edges, and therefore, some cycles may remain in the merged graph that cannot be eliminated on the basis of lifespan overlap. Instead, these cycles are removed by operating directly on the graph at step 56, as described below.

Figure 7A:
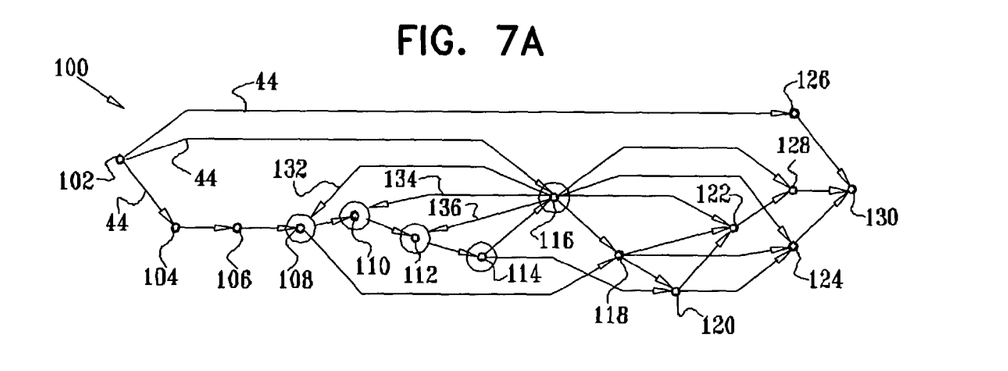
FIG. 7A is a process model graph containing a strongly-connected component.
Figure 7B:
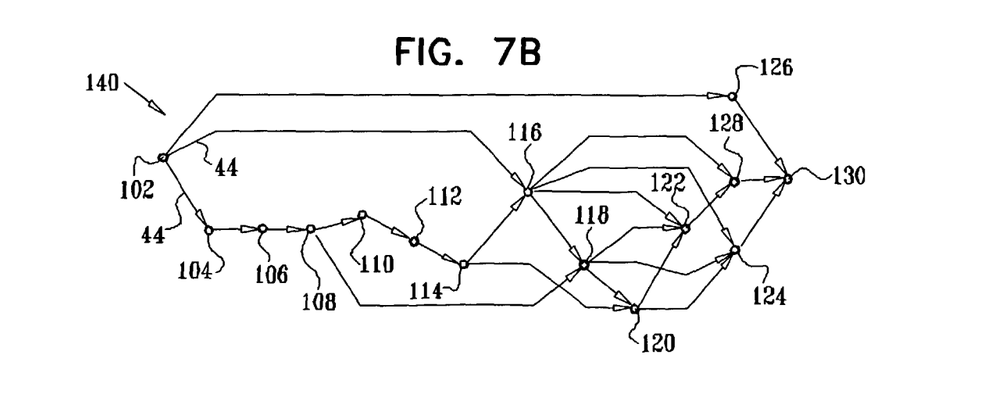
FIG. 7B shows the process model graph of FIG. 7A following removal of the strongly-connected component, using a method in accordance with an embodiment of the present invention.

Reference is now made to FIGS. 7A and 7B which show exemplary merged graphs 100 and 140, respectively, which are generated at steps 54 and 56 of the method described above. Graph 100, generated at step 54, includes a start node 102 and an end node 130, connected through nodes 104, 106, 108, 110, 112, 114, 116, 118, 120, 122, 124, 126 and 128. Nodes 108, 110, 112, 114 and 116, which are circled in this figure, constitute a strongly-connected component, with edges 132, 134 and 136 forming possible cycles in the process flow through the graph.

At step 56, processor 36 recognizes the strongly-connected component in graph 100, using methods of graph processing known in the art, as described, for example, by Cormen et al., in Section 23.5 of *Introduction to Algorithms* (MIT Press, Cambridge, Mass., 2000) pages 488-493, which is incorporated herein by reference. The processor then removes certain spurious edges in order to break the strong connection between the nodes and thus remove the cycle from the graph. To formalize the method of removing the spurious edges, let H be the strongly-connected component, within a total set of nodes V(G) in graph G, which includes edges E(G). The neighbors of node v ∈ V(G) are denoted N(v). The processor divides the nodes v ∈ H in the strongly-connected component into four groups:

$M_h = \{v \in V(H) | N(v) \subseteq V(H)\}$—nodes all of whose adjacent nodes and edges are also in the strongly-connected component.

$B_h = \{v \in V(H) | \exists x, y \in \{V(G) - V(H)\}$ and $(x,v),(v,y) \in E(G)\}$—nodes having at least one incoming edge (x,v) and one outgoing edge (v,y) that are not in the strongly-connected component.

$I_h = \{v \in V(H) - V(B_h) | \exists x \in \{V(G) - V(H)\}$ and $(x, v) \in E(G)\}$ $O_h = \{v \in V(H) - V(B_h) | \exists y \in \{V(G) - V(H)\}$ and $(v, y) \in E(G)\}$ In graph 100, M contains nodes 110 and 112, B contains nodes 108 and 116, O contains node 114 and I is empty.

To remove the cycle from the merged process graph, processor 36 removes the following edges:

All edges in $E(B_h)$;

The edges going from $V(B_h)$ to $V(I_h)$; and

The edges going from $V(M_h)$ to $V(I_h)$

After removing these edges, the processor reevaluates the sets M, B, I and O. The edge removal step is repeated, continuing iteratively in this manner until the strongly-connected component is eliminated. Thus, in the example of graph 100, at the first iteration the processor removes edge 132, so that node 108 is removed from the strongly-connected component. Consequently, M now contains node 112, B contains node 116, I contains node 110 and O contains node 114. At the next iteration, the processor removes edge 134, so that node 110 is removed from the strongly-connected component. This leaves B containing node 116, I containing node 112, O containing node 114 and M empty. Then, at the final iteration, edge 136 is removed.

The resulting, cycle-free graph 140 is shown in FIG. 7B. Although the method of step 56 removes certain edges from the merged graph, it does so in such a way that graph 140 still reproduces all the legal executions in the process log. The removed edges are simply artifacts of the approximation process that is used to derive the process model graph from the executions in the log.

The methods and systems of the present invention may be used in modeling a variety of different types of complex processes. In the embodiments described above, these methods are applied mainly to off-line modeling of business processes based on stored event logs. Other event and activity records may be used instead of or in addition to these logs. For example, relations among different execution systems may be modeled using messages sent between the systems as evidence of the occurrence and timing of activities. The messages may also be used to correlate the activities in the respective logs of the different systems. The methods of the present invention may then be applied to deduce concurrency information across the different systems. Alternatively or additionally, the methods described herein may be adapted to receive event inputs and build a model of a process while the process is running, for purposes of run-time monitoring and diagnostics. Furthermore, the usefulness of these methods is not limited to business processes per se. Rather, the principles of the present invention may also be applied to modeling, optimization and reverse engineering of other software-related processes, such as database operations.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for process modeling, comprising:

using a log processor, reading from a computer memory respective records of a plurality of executions of a process comprising activities;

generating in the log processor a plurality of execution graphs corresponding respectively to the executions of the process and having nodes corresponding to the activities; and merging the execution graphs using the log processor to create a process model graph that comprises the nodes and models the process, including start and end activities of the process, wherein the execution graphs represent legal flows over the process model, which comprise both the start and end activities, while different ones of the execution graphs comprise different, respective subsets of the nodes in the process model graph.

2. The method according to claim 1, wherein the process graph comprises a plurality of the nodes corresponding to the activities in the process, and wherein merging the execution graphs comprises creating flow graphs by combining the execution graphs that comprise the same respective subset of the nodes, and merging the flow graphs to generate the process model graph.

3. The method according to claim 1, wherein generating the plurality of the execution graphs comprises, for each execution among the plurality of the executions:

adding the nodes corresponding to the activities in the process occurring in a record of the execution to a corresponding one of the execution graphs, including, in at least one of the execution graphs, the nodes corresponding to at least first and second activities among the activities in the process; and adding an edge from one of the nodes corresponding to the first activity to another of the nodes corresponding to the second activity only if the finish event of the first activity precedes the initiating event of the second activity.

4. The method according to claim 3, wherein adding the edge comprises adding the edge only if there is no third activity having a lifespan that starts and ends between the finish event of the first activity and the ready event of the second activity.

5. The method according to claim 1, wherein the process model graph comprises a plurality of the nodes corresponding to the activities in the process, wherein the nodes are connected by directed edges, and wherein merging the execution graphs comprises identifying a strongly-connected component comprising three or more of the nodes in the process model graph, and removing at least one of the directed edges between the nodes in the strongly-connected component.

6. The method according to claim 5, wherein removing the at least one of the directed edges comprises eliminating a cycle from the process model graph.

7. The method according to claim 5, wherein removing the at least one of the directed edges comprises partitioning the nodes in the strongly-connected component into multiple sets, depending on the directed edges connecting the nodes in the strongly-connected component to the nodes outside the strongly-connected component, and choosing the at least one of the directed edges to remove based on the partitioning.

8. A method for process modeling, comprising:
using a log processor, reading from a computer memory respective records of a plurality of executions of a process comprising activities;
generating in the log processor a plurality of execution graphs corresponding respectively to the executions of the process; and
merging the execution graphs using the log processor to create a process model graph that models the process and comprises a plurality of nodes that correspond to the activities in the process and are connected by directed edges;
identifying, using the log processor, a strongly-connected component comprising three or more of the nodes in the process model graph;
partitioning the nodes in the strongly-connected component, using the log processor, into multiple sets, depending on the directed edges connecting the nodes in the strongly-connected component to the nodes outside the strongly-connected component; and
based on the partitioning, removing from the process model graph, using the log processor, at least one of the directed edges between the nodes in the strongly-connected component.

9. The method according to claim 1, and comprising receiving from a plurality of workstations reports of events in the course of the executions of the process, and recording the events and respective times of occurrence of the events in a process log in the memory, wherein reading the respective records comprises reading the reports of the events from the process log.

10. The method according to claim 9, wherein the work stations report on different, respective steps in a production process.

* * * * *